United States Patent
Langrock et al.

(10) Patent No.: US 12,008,437 B2
(45) Date of Patent: Jun. 11, 2024

(54) METHOD AND APPARATUS FOR QUBIT ERROR DETECTION

(71) Applicant: Forschungszentrum Jülich GmbH, Jülich (DE)

(72) Inventors: Veit Langrock, Würselen (DE); David Divincenzo, Voerendaal (NL)

(73) Assignee: Forschungszentrum Jülich GmbH (DE)

( * ) Notice: Subject to any disclaimer, the term of this patent is extended or adjusted under 35 U.S.C. 154(b) by 302 days.

(21) Appl. No.: 17/434,163

(22) PCT Filed: Feb. 13, 2020

(86) PCT No.: PCT/EP2020/053735
§ 371 (c)(1),
(2) Date: Aug. 26, 2021

(87) PCT Pub. No.: WO2020/173714
PCT Pub. Date: Sep. 3, 2020

(65) Prior Publication Data
US 2022/0172097 A1    Jun. 2, 2022

(30) Foreign Application Priority Data
Feb. 27, 2019    (DE) .......................... 102019202661.3

(51) Int. Cl.
*G06F 11/00*    (2006.01)
*G06F 11/30*    (2006.01)
(Continued)

(52) U.S. Cl.
CPC ................... *G06N 10/70* (2022.01)

(58) Field of Classification Search
CPC ..................................................... G06N 10/70
See application file for complete search history.

(56) References Cited

U.S. PATENT DOCUMENTS

2008/0185576 A1*   8/2008   Hollenberg ............. G06N 10/00
                                                                    257/14
2017/0317203 A1    11/2017   Petta et al.
(Continued)

FOREIGN PATENT DOCUMENTS

WO         2018062991 A1      4/2018
WO    WO-2018062991 A1 *      4/2018    .......... G06F 11/1076

OTHER PUBLICATIONS

Li et al., "A crossbar network for silicon quantum dot qubits," Sci. Adv., Jul. 6, 2018, 10 pages, 4:eaar3960.
(Continued)

*Primary Examiner* — Samir W Rizk
(74) *Attorney, Agent, or Firm* — Dickinson Wright PLLC (57) ABSTRACT

The invention relates to a method and an apparatus for detecting a state of a data qubit by means of a parity qubit, wherein both the data qubit and the parity qubit can be moved by a moving means, wherein the distance between the data qubit and the parity qubit is so large that the parity qubit cannot query the state of the data qubit, wherein the distance between the data qubit and the parity qubit is reduced by moving the data qubit along a first path and the parity qubit along a second path until the state of the data qubit can be queried by the parity qubit, characterized in that the first path is longer than the second path and/or that the speed of movement of the parity qubit is greater than the speed of movement of the data qubit.

20 Claims, 4 Drawing Sheets

(51) Int. Cl.
*G06N 10/70* (2022.01)
*G08C 25/00* (2006.01)
*H03M 13/00* (2006.01)
*H04L 1/00* (2006.01)

(56) References Cited

U.S. PATENT DOCUMENTS

2020/0119748 A1* 4/2020 Lucarelli ............ G06N 10/00
2021/0279134 A1* 9/2021 Versluis ............. G06N 10/00
2022/0172097 A1* 6/2022 Langrock ........... G06N 10/70

OTHER PUBLICATIONS

Loss et al., "Quantum computation with quantum dots," Physical Review A, Jan. 1998, pp. 120-126, vol. 57, No. 1, The American Physical Society.

Yoneda et al., "A quantum-dot spin qubit with coherence limited by charge noise and fidelity higher than 99.9%," Nature Nanotechnology, Feb. 2018, pp. 102-106, vol. 13, Machmillian Publishers Limited, https://www.nature.com/articles/s41565-017-0014-x.

Chiaverini et al., "Realization of quantum error correction," Nature, Dec. 2, 2004, pp. 602-605, vol. 432, Nature Publishing Group, www.nature.com/nature.

Helsen et al., "Quantum error correction in crossbar architectures," Quant-Ph, Dec. 20, 2017, 38 pages.

Fujita et al., "Coherent shuttle of electron-spin states," Nature Partner Journals, Jun. 12, 2017, 6 pages, www.nature.com/npjqi.

International Search Report with English Translation of International Patent Application No. PCT/EP2020/053735, Apr. 29, 2020, 4 pages.

English Translation of the Written Opinion of International Patent Application No. PCT/EP2020/053735, May 13, 2020, 6 pages.

Taylor et al., Fault-tolerant architecture for quantum computation using electrically controlled semiconductor spins, nature physics vol. 1 Dec. 2005, pp. 177-183.

Fowler, Surface codes: Towards practical large-scale quantum computation, Physical Review A 86, 032324 (2012), DOI: 10.1103/PhysRevA.86.032324, pp. 032324-1-032324-48.

Elzerman et al., Single-shot read-out of an individual electron spin in a quantum dot, Nature—vol. 430—Jul. 22, 2004, pp. 431-435.

* cited by examiner

METHOD AND APPARATUS FOR QUBIT ERROR DETECTION

CROSS-REFERENCE TO RELATED APPLICATIONS

The present application is a national phase application of International Patent Application No. PCT/EP2020/053735, filed on Feb. 13, 2020, which claims priority to German Patent Application No. 102019202661.3, filed on Feb. 27, 2019, entitled "METHOD AND APPARATUS FOR QUBIT ERROR DETECTION," the disclosures of which are hereby incorporated by reference in their entireties.

TECHNICAL FIELD

The disclosure relates to a method and apparatus for qubit fault detection.

BACKGROUND

The quantum bit (called qubit for short) serves as the smallest memory unit in quantum computers or quantum cryptography. In agreement, a qubit can only assume two measurable states, which can be designated as 0 and 1, as in the case of the bit memory unit.

Unlike a bit, a qubit can take more than two states before a measurement.

If the two measurable states are designated as 0 and 1, then the states other than 0 and 1 cannot be measured. As soon as the state of a qubit is measured, then the measurement causes the qubit to assume either the state 0 or the state 1.

In practice, a qubit is usually realized by a quantum physical system that can only assume two measurable states. A system with an electron in which only the spins $\frac{1}{2}$ and $-\frac{1}{2}$, or "spin up" and "spin down", can be measured can serve as a qubit. The spin of an electron can take quantum mechanical states before its measurement, which result from the superposition of the possible spins $\frac{1}{2}$ and $-\frac{1}{2}$ or "spin up" and "spin down". Thus, the spin of an electron can be both $\frac{1}{2}$ and $-\frac{1}{2}$ or "spin up" and "spin down" before its measurement. A superposition (overlay) of these states is called superposition in quantum mechanics. The publication "Li et al., A crossbar network for silicon quantum dot qubits, Sci. Adv. 2018; 4: eaar3960, 6 Jul. 2018" discloses qubits for a quantum computer which are realized by electron spins.

Another quantum physical phenomenon is called entangling (interleaving). When two or more particles are entangled with each other, they no longer behave independently. If two particles are entangled with each other, the state of one particle depends on the state of the other particle and vice versa. There is a correlation between the two particles.

Superposition and entangling are exploited in a quantum computer for a calculation. Once a quantum computer has calculated, the result is measured. In the case of electrons, the spin states are measured after the calculation. The measurement result then reflects the calculated result.

There are also other ways to realize a qubit in practice. For example, a qubit can be realized by a superconducting resonant circuit in which only two different levels of electric currents can flow. Excitation levels of neutral atoms or ions can be used to realize qubits in practice.

From the publication WO 2018/062991 A1 it is known to store logical 0 and 1 states in multi-qubit structures called logical qubits by physical connection and implementation of suitable interactions between physical qubits.

A large number of logical qubits associated with the exchange and processing of quantum information and thus the performance of quantum computations is called a quantum processor, quantum chip, or quantum computer.

An arrangement known from the publication WO 2018/062991 A1 is a grid of qubits in a plane, which can be produced by lithographic methods.

From the publication WO 2018/062991 A1, it is known that production limitations, material limitations, control accuracy limitations, couplings with external noise sources, interaction with external particles, etc. lead to the decay of the physical qubit quantum state from a desired quantum state to an incoherent state. Therefore, the information stored in the physical qubits (superpositions of 0 and 1) is inherently unstable.

It is known from the publication WO 2018/062991 A1 that by encoding a logical quantum state using several physical qubits, a much more stable system is created that stores information and makes it less susceptible to external influences. In order to be able to detect and correct faults, qubits called "ancillary qubits" are also used. These qubits used for monitoring purposes are hereafter called parity qubits. A qubit whose correct state is determined by means of a parity qubit is called data qubit in the following.

A method is known from the publication WO 2018/062991 A1 for detecting faults in data qubits using parity qubits.

In the publication "Quantum computation with quantum dots, Daniel Loss and David P. DiVincenzo, 1998 PHYSICAL REVIEW A JANUARY 1998 VOLUME 57, NUMBER 1, p. 120-126" a quantum computation by means of electrically controlled spins of excess electrons is described.

From the publications "A quantum-dot spin qubit with coherence limited by charge noise and fidelity higher than 99.9%, Jun Yoneda et al, NATURe NANOTecHNOIOGY|VOL 13|FEBRUARY 2018|102-106|" (see https://www.nature.com/articles/s41565-017-0014-x), "A crossbar network for silicon quantum dot qubits, Ruoyu Li et al., Sci. Adv. 2018; 4: eaar3960, 6 Jul. 2018" and US 2017/0317203 A1, qubits realized by electron spins are known. Qubits can be manipulated by moving in a gradient magnetic field. In the publications "A crossbar network for silicon quantum dot qubits, Ruoyu Li et al., Sci. Adv. 2018; 4: eaar3960, 6 Jul. 2018" and "Fault-tolerant architecture for quantum computation using electrically controlled semiconductor spins, J. M. TAYLOR et al., nature physics VOL 1 Dec. 2005, p. 177-183" transport devices are described by which qubits can be moved.

From the publication "Surface codes: Towards practical large-scale quantum computation, Austin G. Fowler et al, PHYSICAL REVIEW A 86, 032324 (2012), DOI: 10.1103/PhysRevA.86.032324" it is known to determine faults in data qubits by parity qubits. From this publication it is known that qubits can be realized by ions, spins in semiconductors or superconducting circuits.

From the publication "Single-shot read-out of an individual electron spin in a quantum dot, J. M. Elzerman, R. Hanson, L. H. Willems van Beveren, B. Witkamp, L. M. K. Vandersypen & L. P. Kouwenhoven, NATURE|VOL 430|22 Jul. 2004, p 431-435" the provision of parity qubits from a fermion lake is known.

From the publications US 2008/0185576 A1 and "Chiaverini et al., Realization of quantum error correction, Nature, Vol. 432, 2 Dec. 2004, pp. 602-605" methods for the detection of faulty states of data qubits using parity qubits are known.

The task of the disclosure is to enable to detect faulty states in data qubits in a suitable manner.

SUMMARY

A method with the features of the first claim serves to solve this task. An apparatus comprises the features of the additional claim for performing the method. Advantageous embodiments result from the dependent claims.

To solve the problem, a method is provided for detecting a faulty state of a data qubit using a parity qubit. The parity qubit can be moved by a movement device. In addition, a movement device may be provided with which the data qubit can be moved. The distance between the data qubit and the parity qubit is initially so large that the parity qubit cannot be entangled with the data qubit. The distance between the data qubit and the parity qubit is reduced by moving the data qubit along a first path and the parity qubit along a second path until the data qubit has been entangled with the parity qubit. The second path is longer than the first path and/or the speed of movement of the parity qubit is greater than the speed of movement of the data qubit.

The state of data qubits is regularly more unstable compared to initially selected states of parity qubits. According to the disclosure, the occurrence of faults in data qubits is avoided by moving data qubits only relatively shortly and/or relatively slowly compared to parity qubits. Since states of parity qubits can be selected in such a way that these states are initially comparatively stable, parity qubits can be moved comparatively unproblematically. Faulty states of data qubits can be detected reliably. The occurrence of faults in data qubits is avoided by moving them only slightly and/or only slowly. Since the state of parity qubits can be selected to be comparatively stable initially, it is not critical to move them over longer distances and/or at higher speeds.

In order to entangle parity qubits with data qubits, therefore, preferably the parity qubits are first moved at fast speed in the direction of the data qubits. Following such a fast movement of the parity qubits, the data qubits are preferably moved at slow speed in the direction of the parity qubits to thereby reduce the distance such that parity qubits are entangled with data qubits. Once the parity qubits have been completely entangled with the data qubits, the data qubits are preferably moved away from the parity qubits at a slow speed. If the distance between data qubits and parity qubits has been sufficiently increased, the parity qubits are preferably moved to measuring stations at fast speed.

However, parity qubits are preferably also moved slowly, i.e. at low speed, if the distance to data qubits is small, in order to avoid an increased error rate. This happens in particular when a parity qubit has already been entangled with one or more data qubits and that parity qubits is now to be entangled with further one or more data qubits. In one embodiment, therefore, one or more parity qubits are first moved at fast speed in the direction of the data qubits. After a first entangling with data qubits, the parity qubits are then initially moved further at slow speed to entangle parity qubits with next data qubits.

A slow movement or a slow speed means that the speed is slow compared to the mentioned fast movement or fast speed.

The parity qubit is basically in a measurable state before this is moved to one or more data qubits for the purpose of entangling. If the parity qubit is realized by a spin ½ particle, the spin is thus either ½ or −½. The parity qubit is thus not in a quantum mechanical state of superposition in which the spin is both ½ and −½ at the same time, according to human attempts to explain. The state of the parity qubit is then particularly stable, so that the parity qubit can be moved over long distances and/or at high speed without the state of the parity qubit being changed with non-negligibly small probability for this reason alone.

Advantageously, the parity qubit is moved between two data qubits. A parity qubit can then be entangled with two data qubits simultaneously.

Two data qubits that are entangled with the parity qubit can be in the correlated quantum mechanical state in a scheduled manner for redundancy reasons to reduce fault-proneness in an improved manner. For example, two data qubits can then be in the same quantum mechanical state. The parity qubit can then be used to check whether both data qubits are in the correlated, for example, the same quantum mechanical state. If this is the case, the probability is high that both data qubits are in the scheduled state. Thus, no fault has occurred. If it is determined by means of the data qubit, which has been entangled with the two data qubits, that the two states of the data qubits are different, then a fault has been detected.

By scheduled state is meant a state that is intended, for example, to be able to calculate by means of the system. If a parity qubit has been entangled with one or more data qubits, a change in the state of a data qubit can result in a change also in the state of the parity qubit. If the state of the parity qubit is finally measured and it is determined that the state of the parity qubit has changed, the presence of a fault is detected.

In one embodiment, after the movement between two first data qubits and after a query of these two first data qubits, the parity qubit is moved between two further data qubits a to also entangle them with the parity qubit. The four data qubits may be in the correlated state in a scheduled manner or may have been brought into the correlated state in a scheduled manner for redundancy reasons. Overall, a parity qubit can serve in this way to check whether four parity qubits provided for redundancy reasons are in the intended correlated state, in order to be able to detect faults particularly reliably. If the state of the parity qubit is finally measured and the measurement shows that the state of the parity qubit has changed, this determines that a fault has occurred.

The parity qubit is advantageously moved away from two data qubits after moving between these data qubits and after an entangling with the two data qubits. Thereby the distance between the parity qubit and the data qubits is increased such that sufficient space is available to be able to measure the state of the parity qubit. After moving away, the state of the parity qubit can therefore be measured with relatively little technical effort.

Advantageously, a plurality of parity qubits is moved at the same time between data qubits opposite to one another in pairs to entangle each parity qubit with at least two data qubits. Fault detection can thus be performed in an accelerated and improved manner.

Advantageously, a row of parity qubits is moved between two rows of data qubits. In one embodiment, once a row of parity qubits has been moved between two rows of data qubits, the two rows of data qubits are subsequently moved in the direction of the parity qubits such that the distance is finally small enough to entangle each parity qubit with two adjacent data qubits. This embodiment further contributes in an improved manner to ensure that faults can be reliably determined without thereby unduly increasing the fault-proneness.

A row of parity qubits is advantageously moved away from two rows of data qubits following an entangling. After moving away, the distance between the parity qubits and the data qubits is so large that the state of the parity qubits can be measured with little technical effort. The moved-away parity qubits can then be moved to measuring stations. By means of the measuring stations the states of the parity qubits are measured to check whether one or more data qubits are or have been in a faulty and therefore in an unscheduled state.

In one embodiment, a qubit comprises exactly one particle with spin ½ or −½ or a plurality of particles with spin ½ or −½. The particle may be an electron or a defect electron. Particles with spin ½ or −½ can be moved in a manner known in the prior art by comparatively simple technical means to carry out the disclosure. A transport device provided for moving a qubit can, for example, generate and/or change an electric field to move a qubit. In particular, potential barriers are changed for moving, thereby changing residence probabilities for qubits. Qubits have then been moved. Constructions known from the prior art mentioned at the beginning may be provided for this purpose.

In one embodiment of the disclosure, data qubits and parity qubits are continuously entangled with each other in accordance with the disclosure. After entangling, the states of the parity qubits are measured in order to continuously perform fault monitoring.

The disclosure further relates to an apparatus configured such that a previously described method can be carried out by said apparatus.

Such an apparatus comprises data qubits and parity qubits or at least means for generating data qubits and parity qubits. The apparatus may comprise a movement device with which data qubits and parity qubits can be moved. The apparatus may be configured such that the distance between a data qubit and a parity qubit can be so large that the parity qubit will not be entangled with the data qubit and therefore is not entangled. The apparatus may be configured such that the distance between the data qubit and the parity qubit may be reduced by moving the data qubit along a first path and the parity qubit along a second path until the data qubit is entangled with the parity qubit. The apparatus may be configured such that the first path is longer than the second path and/or that the speed of movement of the parity qubit is greater than the speed of movement of the data qubit in order to entangle the parity qubit with the data qubit.

The apparatus may be configured such that the parity qubit can be brought into a measurable state. By this is meant that the parity qubit is not brought into a relatively unstable state of superposition that cannot be determined by measurement. A fermion may serve to provide of a parity qubit. The apparatus may be configured such that a measurable spin state of the fermion is adjustable by the apparatus, for example by means of a magnetic field that may be provided or generated by the apparatus. The magnetic field is preferably a static gradient field in order to be able to manipulate the state of a qubit. Constructions known from the prior art mentioned at the beginning may be provided for this purpose. Alternatively, qubits are manipulated by spin-orbit couplings.

The apparatus may be configured such that, after moving between a first pair of data qubits and after entangling with the two data qubits of the first pair of data qubits, the parity qubit can be moved between a further pair of data qubits to be entangled with the two further data qubits.

The distance between two opposing data qubits is preferably not changed when the aforementioned parity qubit is moved from the first pair of data qubits between two further data qubits of a second pair. This reduces the fault-proneness in a further improved manner, especially since the distance for moving a parity qubit from the first pair of data qubits to a next pair of data qubits can be very short.

The apparatus may be configured such that the parity qubit is moved away after moving between two data qubits and after entangling the parity qubit with the data qubits. The apparatus may be configured such that the state of the moved-away parity qubit can be measured.

The apparatus may be configured such that a plurality of parity qubits may be moved at the same time between data qubits opposite to one another in pairs. The apparatus may be configured such that subsequently the data qubits can be moved in the direction of the parity qubits to cause entangling.

The apparatus may be configured such that a row of parity qubits can be moved between two rows of data qubits. The apparatus may be configured such that subsequently the two rows of data qubits are moved toward the row of parity qubits such that entangling occurs between each parity qubit and two adjacent data qubits to enable a fault check.

The apparatus may be configured such that a row of parity qubits can be moved away from two rows of data qubits, and subsequently, the parity qubits of the moved-away row of parity qubits can be moved to one or more measurement stations of the apparatus.

The apparatus may be configured such that a row of parity qubits is recurrently moved between two rows of data qubits to entangle each parity qubit with at least two data qubits and to move the parity qubits to measurement stations following the entangling.

The apparatus may be configured such that a qubit comprises exactly one electron or more electrons, which can have a spin ½ or −½. Instead of an electron, another spin ½ particle may be used. The apparatus may be configured such that a semiconductor is provided to form qubits.

The apparatus may be configured such that a transport device of the apparatus can generate an electrostatic limiting potential. A qubit can then be moved by means of electrostatic limiting potentials.

The apparatus may generate one or more alternating electric and/or magnetic fields and/or gradient fields to be able to perform the method. The apparatus may comprise silicon/silicon germanium heterostructures to provide qubits. However, the apparatus may also comprise germanium/silicon germanium heterostructures or zinc selenide to provide qubits.

States of parity qubits can be measured for example by a Pauli-spin blockade.

In one embodiment of the disclosure, a parity qubit comprises at least two particles such as electrons in a singlet state or triplet state. Preferably, one or more parity qubits are in the singlet state prior to an entangling. After an entangling, due to a fault, a singlet state of a parity qubit may have been converted to a triplet state, which can be reliably determined by measurement with little technical effort. An apparatus then comprises means for bringing electrons from a fermion reservoir into a singlet state or a triplet state. After performing entangling, the singlet state of the parity qubit can be converted to a charge state in the two quantum dots (singlet with (2,0), triplet with (1,1), see publication RevModPhys.79.1217), which can be transported extremely robustly and subsequently measured with little effort.

In one embodiment, the apparatus comprises means for generating an electromagnetic wave to adjust the state of data qubits.

Alternatively, the apparatus comprises means for providing a magnetic gradient field. By moving a data qubit in the magnetic gradient field, a desired state of a data qubit can be adjusted. In particular, the last path to adjust a state of a data qubit can be technically realized by the architecture without reaching technical feasibility limits.

To solve the task only the parity qubit can be moved. The data qubit is then not moved. The speed of movement of the data qubit and the length of the second path are therefore zero. Otherwise, this variant does not differ from the otherwise described solution according to the disclosure and embodiments thereof.

BRIEF DESCRIPTION OF THE DRAWINGS

The figures show

DETAILED DESCRIPTION

Figure 1:
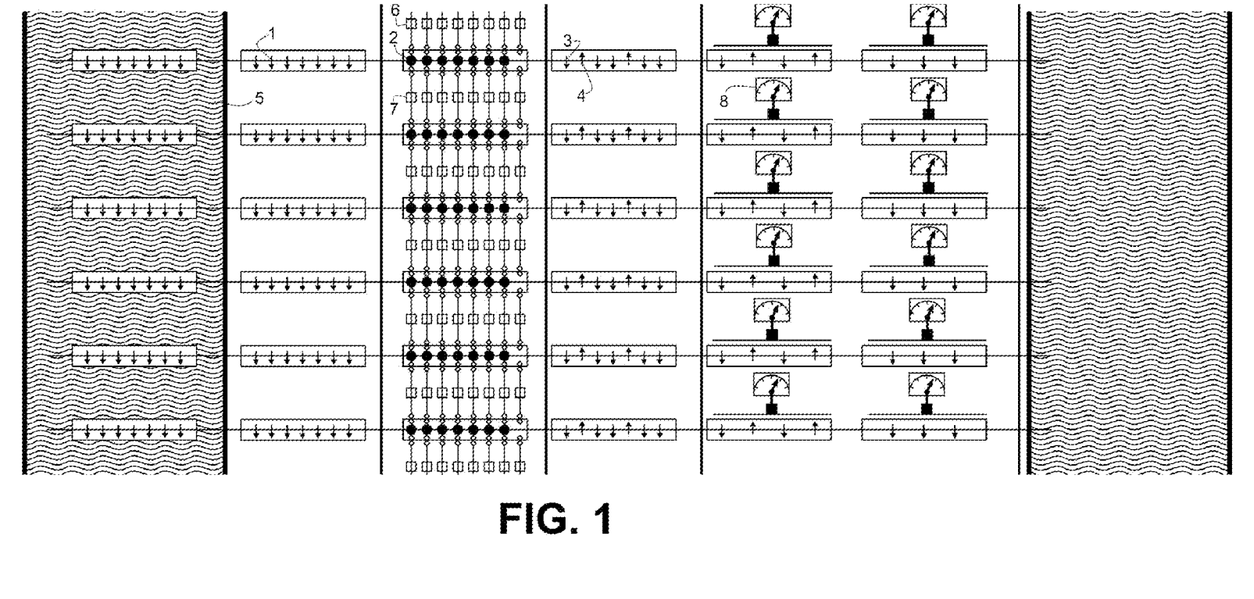
FIG. 1: schematic representation of an architecture for detecting faulty states of data qubits using parity qubits.

FIG. 1 illustrates an architecture for detecting faulty states of data qubits by means of parity qubits. A parity qubit 1, 2, 3, 4 comprises an electron with measurable "spin up" and "spin down" spins or another spin ½ particle such as defect electrons. When in the following reference is made to electrons, this applies in the same way to other spin ½ particles, unless explicitly stated otherwise. The parity qubits 1 and 3 shown in FIG. 1 are represented by an arrow pointing downwards. These are therefore in the "spin down" state. The parity qubits 4 are represented by an arrow pointing upwards. These are in the "spin up" state.

An electron reservoir is represented by a Fermi lake 5. Electrons from the Fermi lake are first brought into the spin down state to provide a plurality of parity qubits 1, which may be arranged in series as shown. These parity qubits 1 in the spin down state can be moved between data qubits 6 and 7. Data qubits 6 and 7 can be moved to parity qubits 2 located therebetween such that the distance of a parity qubit 2 to two data qubits 6 and 7 is small enough for entanglement to occur between the parity qubits 2 and the adjacent data qubits 6 and 7 to determine the state of the two data qubits 6 and 7 in terms of fault detection. The path that the data qubits 6 and 7 must travel for this is shorter than the path that the parity qubits 1 must travel to get between the data qubits 6 and 7.

Following an entangling, the data qubits 6 and 7 are moved away from each other, i.e. the distance between the data qubits 6 and 7 is increased. The parity qubits 2 are moved away from the data qubits 6 and 7. The path that the data qubits 6 and 7 must travel for this is shorter than the path that the parity qubits 2 must travel to be moved away from the data qubits 6 and 7.

The spin down state of moved-away parity qubits 3 has not been changed. The spin state of moved-away parity qubits 4 has been changed. These are therefore in the "spin up" state. The spin state of the parity qubits 3 and 4 is measured by one or more measuring devices 8.

If the state of the spins of the parity qubits 3 has not been changed, no faulty state of the data qubits 6 and/or 7 entangled therewith could be detected. The state of the spins of the parity qubits 4 has been changed because the state of one or more data qubits 6 and/or 7 entangled with it was faulty. Fault can therefore be detected by measuring the spin states of the parity qubits 3 and 4.

Following a measurement of the spin states of the parity qubits 3 and 4, the electrons of the parity qubits 3 and 4 can be transferred back into a Fermi lake.

With this architecture, fresh parity qubits 1 can be continuously provided to entangle them with data qubits 6 and 7 and finally to measure the spin states for fault monitoring. Thus, it is not necessary to reuse already used parity qubits. A reset of already used qubits can be advantageously omitted. The architecture can be continued at will along the data qubit column. The architecture is therefore scalable. The architecture can be produced in a technically simple manner. This applies in particular to the case where a semiconductor is used for providing qubits.

Figure 2:
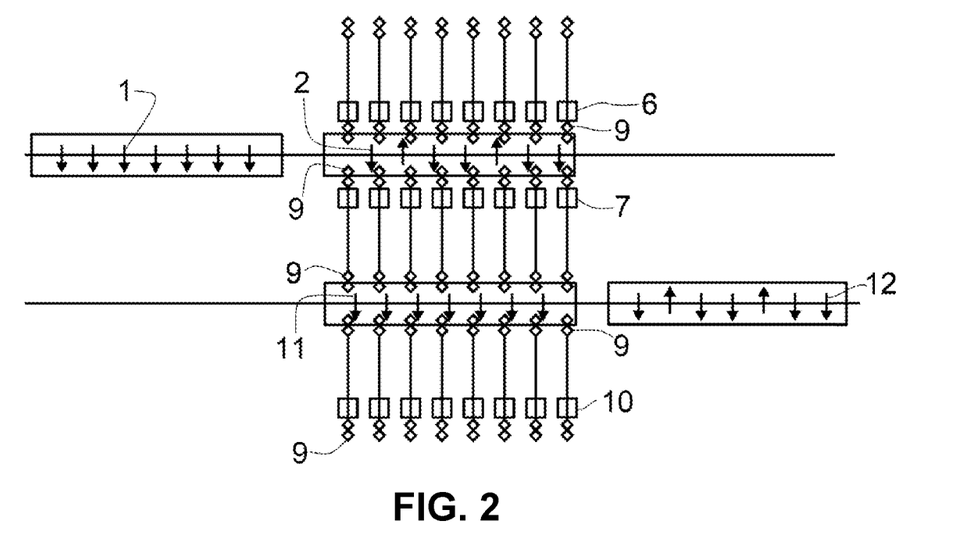
FIGS. 2 to 6: schematic representations of steps for performing fault monitoring.

FIGS. 2 to 6 illustrate a possible sequence in more detail.
FIG. 2 shows seven parity qubits 1 spaced from the eight data qubits 6 and 7 such that the data qubits 6 and 7 are not entangled with the parity qubits 1. There is a first row of eight data qubits 6 and opposite a second row of eight data qubits 7. There are seven parity qubits 2 between the data qubits 6 and 7. The data qubits 6 and 7 have been moved towards each other in the maximum possible way. The distance between the data qubits 6 on one side and the data qubits 7 on the other side is thus minimized. A further reduction of the distance is not possible due to potential barriers 9. Because of this small distance, the data qubits 6 and 7 have been entangled with the parity qubits 2. Since two faults have occurred at data qubits 6 and 7, the spin of two parity qubits 2 has been flipped. The spin state of the second and fourth parity qubit 2 has been changed, seen from left to right. These are therefore no longer in the original "spin down" state but in the "spin up" state.

The seven parity qubits 2 are located between the data qubits 6 and 7 in such a way that the first pair of the opposite data qubits 6 and 7 did not participate in an entangling last.

Below the eight data qubits 7 there are another eight data qubits 10 arranged in a row. The data qubits 7 and the data qubits 10 are spaced such that the distance between the data qubits 7 and the data qubits 10 is at a maximum.

Seven parity qubits 11 have been brought between the data qubits 7 and the data qubits 10. Since the distance between the data qubits 7 and the data qubits 10 is maximum, the parity qubits 11 are not yet entangled with the respectively assigned parity qubits 7 and 10. In contrast to the parity qubits 2, the parity qubits 11 have been moved between the data qubits 7 and 10 in such a way that there is no parity qubit 11 between the last pair, i.e. the pair on the right-hand side, of the opposing data qubits 1 and 10.

To the right of parity qubits 11 are seven parity qubits 12, which have been moved away from data qubits 7 and 10 following entangling, so that parity qubits 12. These parity qubits 12 are available for measurement.

Figure 3:
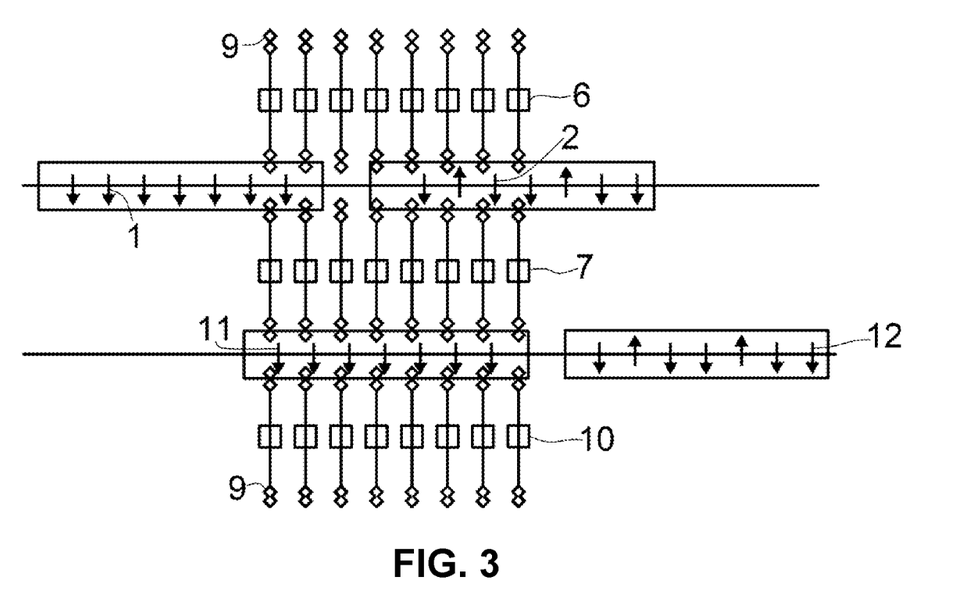

The data qubits 6, 7 and 10 shown in FIG. 3 have been moved back to intermediate positions at slow speed starting from the positions shown in FIG. 2, because a fast movement of the data qubits 6, 7 and 10 would increase a risk of fault. The distance of the data qubits 6, 7 and 10 to the parity qubits 1, 2 and 11 is so large that no entangling between data qubits and parity qubits can be caused. Therefore, starting from the situation in FIG. 2, the parity qubits 2 are now moved to the right to bring them to measuring stations. This is done at a greater speed compared to the speed at which the data qubits 6, 7 and 10 are moved. This is because the parity qubits 2 have a low risk of causing faults due to increased speeds. At the same time, starting from the situation shown in FIG. 2, the parity qubits 1 are moved in the direction of the data qubits 6 and 7 to bring them between the data qubits 6 and 7. This is also done at the greater speed.

Starting from FIG. 3, the data qubits 7 and 10 are moved to the parity qubits 11 in the maximum possible way as shown in FIG. 4, again at a slow speed. The distance between data qubits 7 and 10 is minimized. This causes an entangling, which is indicated by a circle representation of the parity qubits 11 in FIG. 4. During entangling, each parity qubit 11 is located between a data qubit 7 and a data qubit 10. Parity qubits 11 are therefore not laterally offset from data qubits 7 and 10.

Figure 4:
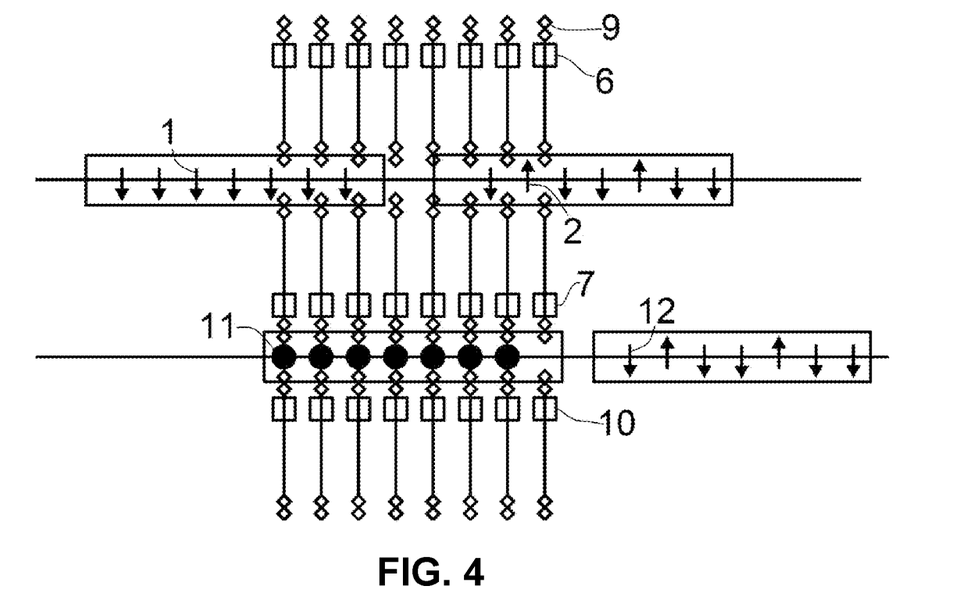

According to FIG. 4, the data qubits 6 have been slowly moved upwards in the maximum possible way away from the parity qubits 1 and 2. The distance between the data qubits 6 and 7 is maximum. Therefore, the parity qubits 1 cannot be entangled with the data qubits 6 and 7.

Furthermore, it is shown in FIG. 4 that the parity qubits 2 are moved further to the right in order to move the parity qubits 2 into a region where installation space for measuring stations is available. The states of the parity qubits 2 can therefore be measured with little technical effort. In addition, the parity qubits 1 are moved further to the right between the data qubits 6 and 7. The parity qubits 1 and 2 continue to be moved with the fast speed.

Figure 5:
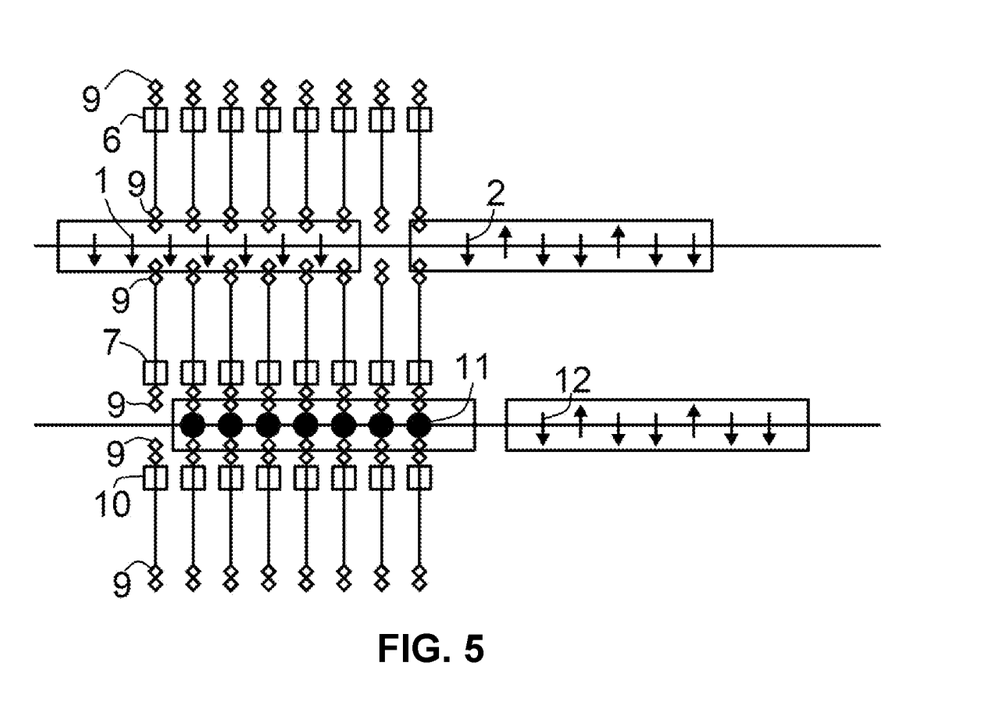

FIG. 5 shows that the parity qubits 11 have been moved on from the situation shown in FIG. 4 in such a way that the last seven data qubits 7 and 10 are now entangled with the parity qubits 11, viewed from left to right. This is now done at slow speed to avoid the occurrence of faults. It is achieved, for example, that the first parity qubit 11 (seen from left to right) has been or will be entangled with the first two data qubits 7 and 10 and subsequently with the second two data qubits 7 and 10. This procedure can therefore be used to entangle a total of four data qubits 7 and 10 with one parity qubit 11 each in order to be able to detect faults in an improved manner.

For example, the first pairs of data qubits 7 and 10 may be in the same non-measurable state for redundancy reasons to reduce fault rates.

Step by step, therefore, a parity qubit 11 can be entangled with data qubit pairs 7 and 10.

Figure 6:
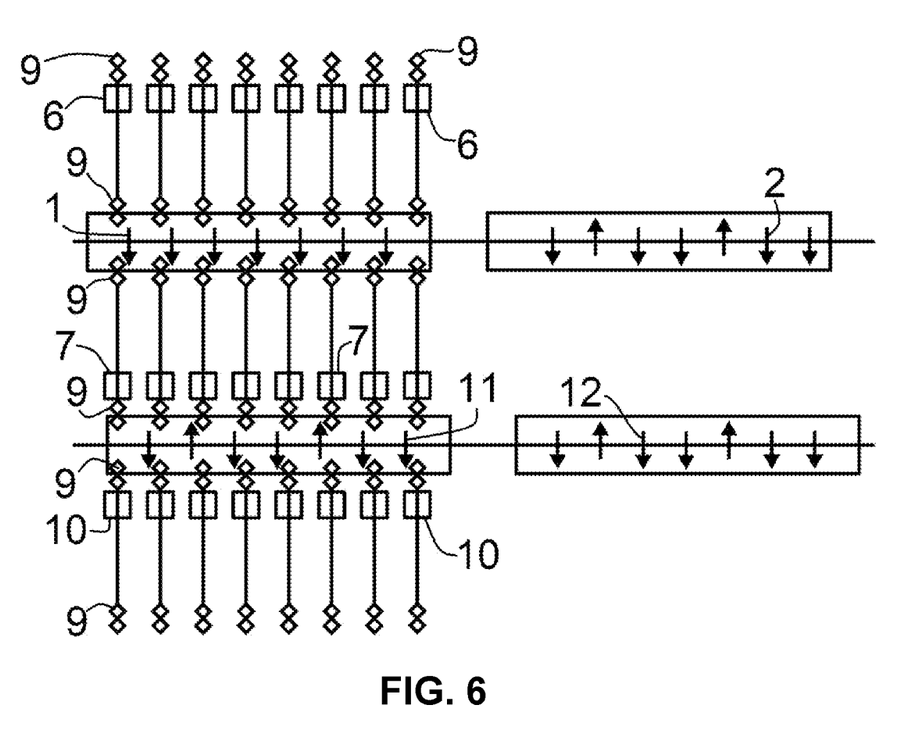

In FIG. 6 it is shown that the parity qubits 1 have now been fully moved between the data qubits 6 and 7 so that the first seven data qubits 6 and 7 are entangled with the parity qubits 1 once the data qubits 6 and 7 have been moved to the parity qubits 1 in the maximum possible way.

The parity qubits 2 have been completely moved away from the data qubits 6 and 7 at a fast speed and are now ready for a measurement.

The entangling of the parity qubits 11 with the data qubits 7 and 10 has been completed. Therefore parity qubits 11 are now again represented by arrows. The state of two parity qubits 11 has been changed. Thus, faults have occurred which have caused the flipping of two spins.

The number of the represented data qubits and/or of the parity qubits can be changed. For example, instead of seven parity qubits, nine parity qubits can be used to entangle them with a total of 16 data qubits.

The method can be performed continuously. The number of measurement stations provided can be selected so that no delay occurs due to measurement. For example, if seven parity qubits 12 are moved out after entangling, there may be more than seven measurement stations, such as 14. The seven parity qubits 12 are then moved to the first seven measurement stations to determine the states by measurement. The next seven parity qubits are then moved to the measurement stations 8-14 to determine the states by measurement if the measurements of the states of the first seven parity qubits 12 have not yet been completed. The number of measurement stations is therefore preferably at least twice as large as the number of the parity qubits that are moved away from data qubits after interleaving with the data qubits. The number of measurement stations can be chosen such that parity qubits can be "parked" so that measurement at measurement stations does not limit speeds.

The figures illustrate that the data qubits are only moved over short distances compared to the distances along which the parity qubits can be moved.

The figures refer to examples only. The scope of protection of the claims is therefore not limited to the examples.

What is claimed is:

1. A method for detecting a faulty state of a data qubit using a parity qubit, wherein at least the parity qubit can be moved by a movement device, wherein a distance between the data qubit and the parity qubit is so large that the parity qubit cannot be entangled with the data qubit, wherein the distance between the data qubit and the parity qubit is reduced by moving the data qubit along a first path and the parity qubit along a second path until the data qubit can be entangled with the parity qubit, characterized in that the second path is longer than the first path and/or in that a speed of movement of the parity qubit is greater than a speed of movement of the data qubit.

2. The method of claim 1, wherein the parity qubit is in a measurable state before it is moved to one or more data qubits for entangling.

3. The method of claim 1 wherein the parity qubit is moved between two data qubits.

4. The method of claim 1 wherein after moving between two data qubits, the parity qubit is moved between two further data qubits.

5. The method of claim 1 wherein the parity qubit is moved away from data qubits after moving between two data qubits and the state of the parity qubit is measured.

6. The method of claim 1, wherein a plurality of parity qubits are moved between data qubits at the same time.

7. The method of claim 1, wherein a row of parity qubits are moved between two rows of data qubits.

8. The method of claim 1, wherein a row of parity qubits are moved away from two rows of data qubits and subsequently, the parity qubits are moved from the moved-out row of parity qubits to measuring stations.

9. The method of claim 1, wherein a qubit comprises at least one electron with a spin ½ or −½.

10. The method of claim 1, wherein a transport device generates an electric field and a qubit is moved by the electric field.

11. An apparatus for performing a method for detecting a faulty state of a data qubit using a parity qubit, comprising data qubits and parity qubits, wherein a movement device is provided, with which the data qubits and the parity qubits can be moved, wherein a distance between the data qubit and the parity qubit can be so large that the parity qubit cannot be entangled with the data qubit, wherein the distance between the data qubit and the parity qubit can be reduced by moving the data qubit along a first path and the parity qubit along a second path until the data qubit can be entangled with the parity qubit, characterized in that the first path is longer than the second path and/or that a speed of movement of the parity qubit can be greater than a speed of movement of the data qubit.

12. The apparatus of claim 11, wherein the parity qubit is in a measurable state and in particular in a singlet state or a triplet state.

13. The apparatus of claim 11, wherein the parity qubit can be moved between two data qubits.

14. The apparatus of claim 11, wherein the apparatus is configured such that after moving between two data qubits, the parity qubit is moved between two further data qubits at a slow speed.

15. The apparatus of claim 11, wherein the parity qubit can be moved away from data qubits after moving between two data qubits and the state of the moved-away parity qubit can be measured.

16. The apparatus of claim 11, wherein a plurality of parity qubits can be moved between data qubits at the same time.

17. The apparatus of claim 11, wherein a row of parity qubits can be moved between two rows of data qubits.

18. The apparatus of claim 11, wherein a row of parity qubits can be moved away from two rows of data qubits and subsequently, the parity qubits can be moved from the moved-out row of parity qubits to one or more measuring stations of the apparatus.

19. The apparatus of claim 11, wherein the parity qubits comprises two electrons and the parity qubit is in a singlet state or a triplet state.

20. The apparatus of claim 11, wherein a transport device can generate an electric field and a qubit can be moved by the electric field.

\* \* \* \* \*